United States Patent [19]
Cassie

[11] Patent Number: 4,909,238
[45] Date of Patent: Mar. 20, 1990

[54] BARBECUE GRILL FEED ASSEMBLY

[75] Inventor: Innes A. Cassie, Waterbury, Conn.

[73] Assignee: Anamet Inc., Waterbury, Conn.

[21] Appl. No.: 396,868

[22] Filed: Aug. 22, 1989

[51] Int. Cl.[4] .............................................. F24C 3/04
[52] U.S. Cl. .................................. 126/41 R; 431/354;
403/80; 403/104; 285/302; 285/330; 239/600
[58] Field of Search ................. 126/41 R, 39 R, 25 R,
126/50, 39 E, 39 H, 40; 431/278, 354, 154, 355;
239/600, 588, 200, 201; 403/80, 104, 109, 383;
285/302, 330; 48/180.1; 248/180.5, 295.1, 125

[56] References Cited
U.S. PATENT DOCUMENTS

| | | | |
|---|---|---|---|
| 1,625,510 | 4/1927 | Tredwell | 285/302 |
| 4,373,505 | 2/1983 | Koziol | 126/41 R |
| 4,485,799 | 12/1984 | Perez | 126/25 R |
| 4,561,798 | 12/1985 | Elcrin et al. | 403/109 |
| 4,598,692 | 7/1986 | Hitch | 126/41 R |
| 4,762,530 | 8/1988 | Koziol | 126/41 R |
| 4,827,899 | 5/1989 | Walters et al. | 126/41 R |

Primary Examiner—James C. Yeung
Attorney, Agent, or Firm—Chilton, Alix & Van Kirk

[57] ABSTRACT

An adjustable gas/air feed assembly for a gas burner having a gas conduit section and an aspirator section mounted for telescopic sliding movement relative to the conduit section. The sections are held at a desired telescopic extension by an adjustable seam carried by the inner section of the assembly, the seam being effective to circumferentially close the inner section while permitting limited radial contraction thereof. The inner section can thus be biased outwardly against the outer section of the assembly for holding the sections at a desired extended position.

15 Claims, 3 Drawing Sheets

BARBECUE GRILL FEED ASSEMBLY

BACKGROUND AND SUMMARY OF THE INVENTION

The present invention relates generally to gas fired barbecued grills and is more particularly concerned with a new and improved adjustable gas/air feed assembly for such grills.

It is well known in the art that adjustable feed assemblies can be advantageously employed with a variety of grill designs and styles. The feed assembly is used to connect the gas supply inlet valve to the gas burner and preferably provides dual adjustability by combining a telescoping structure with a highly flexible conduit section. This combination permits both horizontal and vertical adjustment between the gas inlet valve and the gas burner, making it particularly well suited for use as a replacement part for a large number of different barbecue grill models. The assembly typically includes a corrugated tubular gas conduit section telescopically connected to a venturi or aspirator tube section. Because the interconnection between these two sections simply involves a slip fit, many manufacturers have incorporated features that will hold the two sections at a desired extended position. This holding feature has varied from the set screw arrangement described in Kozial's U.S. Reissue Pat. No. 32,133 to the threaded connections shown in his U.S. Pat. No. 4,679,544 and to the O-ring features described in Hitch's U.S. Pat. Nos. 4,598,692 and 4,624,240 and Kozial's U.S. Pat. No. 4,773,384.

The venturi orr aspirator section of the assembly usually is manufactured from a welded tube of either stainless steel, zinc plated carbon steel or aluminized steel to enhance the corrosion resistance of the assembly. However, due to manufacturing and assembly costs of the welded tube construction, manufacturers have found it necessary to produce these units in those countries where reduced cost can be realized.

Accordingly, it is an object of the present invention to provide a new and improved adjustable feed assembly having a structure that can be made and assembled at significantly reduced cost and where the seam of the venturi or aspirator tube is formed without the welding operation utilized heretofore. The structure described herein has the further advantage of providing both sealability and holding features while eliminating the extra cost associated with the utilization of set screws and O-rings to achieve the desired retention of the assembly in its partially or fully extended positions.

Other objects and advantages of the present invention will be in part obvious and in part pointed out in more detail hereinafter.

These and related objects are accomplished in accordance with the present invention by providing an adjustable gas/air feed assembly for a gas burner with novel and unique means for holding the telescoping sections in their desired extended position. The holding means includes an adjustable seam carried by the inner telescoping section of the assembly whereby the seam is effective both to circumferentially close or seal that section and at the same time allow a spring-like diameter change therein whereby the inner section is bias outwardly against the outer section of the assembly to hold the sections against inadvertent telescopic changes of position.

A better understanding of the objects, advantages, features, properties and relationships of the invention will be obtained from the following detailed description and accompanying drawings which set forth an illustrative embodiment and are indicative of the way in which the principles of the invention are employed.

DESCRIPTION OF A PREFERRED EMBODIMENT

Figure 1:
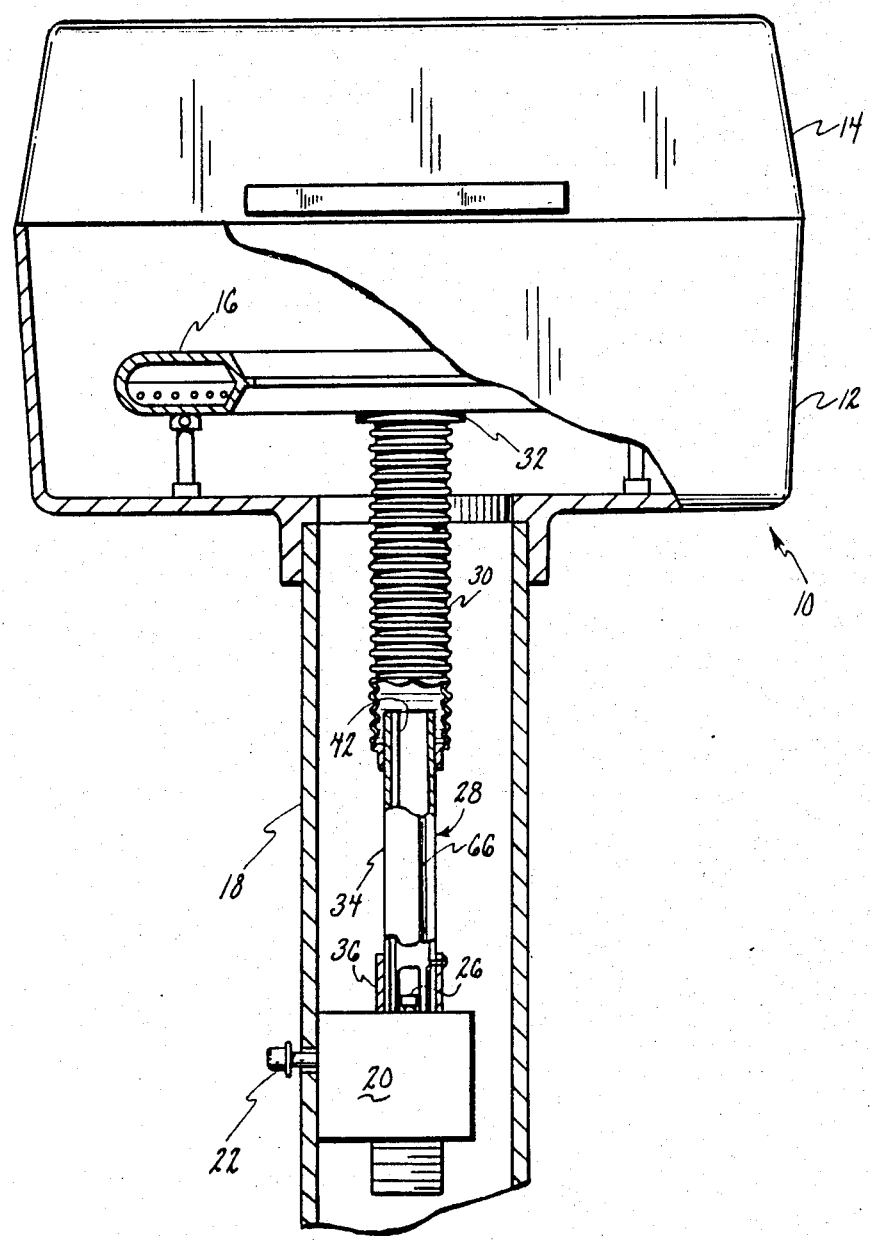
FIG. 1 is a front elevational view, partly broken away and partly in section, showing a fragmentary portion of a gas grill including the gas burner and the adjustable gas/air feed assembly of the present invention.

Referring now to the drawing in greater detail wherein like referenced numerals indicate like parts throughout the several figures, the present invention is shown as being incorporated within a barbecue gas grill, generally indicated by the numeral 10, having a grill housing 12 of typical configuration including a cover 14, for housing a gas burner 16. The housing 12 is mounted on and securely supported by an upstanding post 18 or similar structure that carries a gas control valve 20 and valve regulating dial 22 for controlling the flow of gas from a gas supply line (not shown) to the gas burner 16. The gas control valve 20 is provide with a gas orifice or nozzle 26 leading from the valve 20 toward the gas burner 16, with an adjustable gas/air feed assembly 28 providing the interconnection therebetween. The feed assembly 28 communicates with the gas burner 16 through a flexible gas inlet conduit section 30 that may be of rigid construction but preferably is a flexible corrugated type tubular member having a mounting flange 32 fixed to one end thereof for secure mounting of the assembly 26 to the underside of the gas burner 16. A venturi or aspirator tube section 34 is telescopically connected to the tubular conduit section 30 and is provided with a rotatable air regulating sleeve 36 on the end thereof remote from the conduit section. The sleeve 36 is adapted in a well known fashion for rotation relative to the venturi tube 34 so as to control the size of the ports 38 therein through which intake air is aspirated during gas flow to the burner 16. The sleeve 36 is provided with an axial opening on one end so that the sleeve 36 and the venturi 34 can be assembled in appropriate interfitting relationship with the gas nozzle 26, as shown in FIG. 1, thereby completing the interconnection between the control valve 20 and the gas burner 16.

Figure 2:
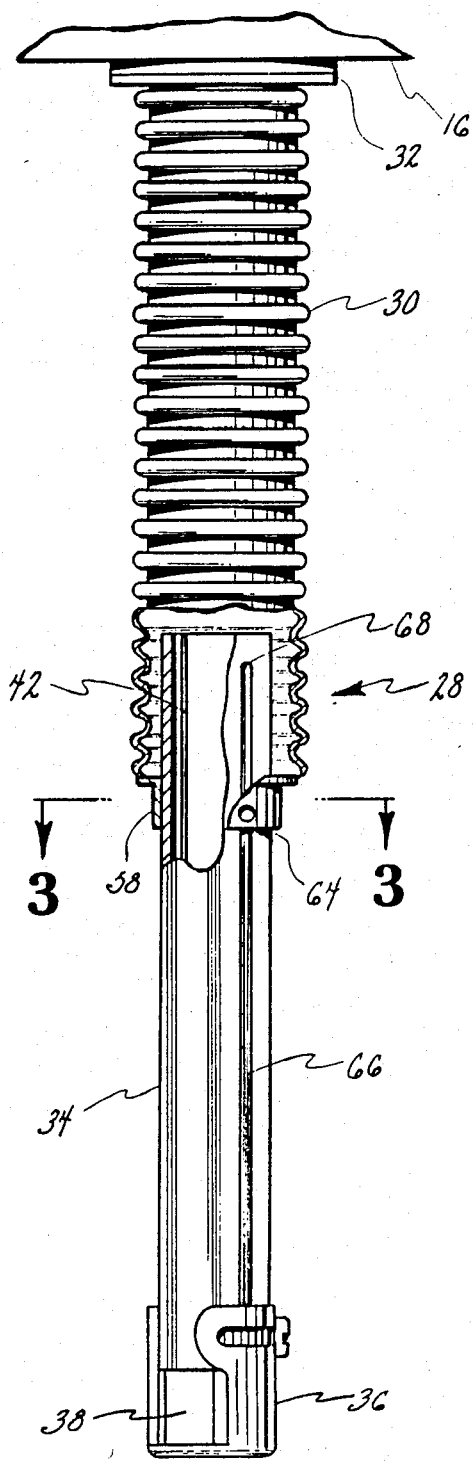
FIG. 2 is an enlarged elevational view of the feed assembly of the present invention partly broken away and partly in section.
Figure 3:
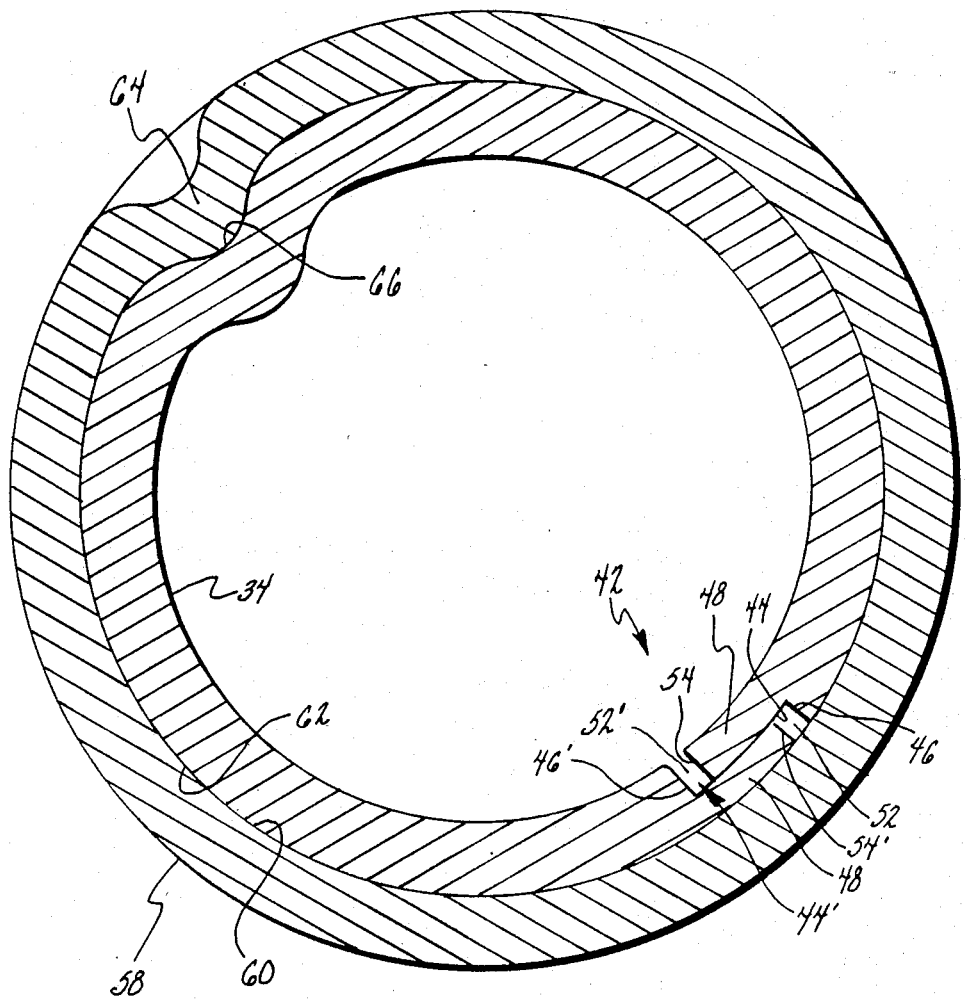
FIG. 3 is a sectional view taken along the line 3—3 of FIG. 2.

In accordance with the present invention, the innermost tube of the telescopic assembly is provided with an adjustable seam that is effective not only to maintain the circumferential integrity of the tube, but also to provide a constant outward bias of the inner section against the outer section. This outward bias assures that the two sections are firmly yet slidably held within their desired adjustable relative positions. In the specific embodiment illustrated, the inner section is the venturi or aspirator tube 34 of the assembly 28 and, as best shown in FIGS. 2 and 3, that section is provided with a longitudinal extending seam indicated generally by the numeral 42, having a rabbet joint construction. The seam 42 extends along substantially the entire length of the tube 34 and includes complimentary mating recesses 44, 44' providing an appropriate overlapping interconnection along the longitudinal edge of the seam. The recesses 44, 44' are defined by shoulder portions 46, 46' and tongue portions 48, 48', respectively, carried by the confronting complimentary edges of the seam. The recesses 44, 44' are arranged so that when the inner aspirator section 34 is in an unstressed rest condition, a gap 52 is defined between the shoulder 46 on one edge and the end 54' of the tongue 48' on the opposite edge. The gap 52 is of a smaller circumferential dimension than that of the tongues 48, 48' so that at its rest position and during full adjustability thereof the seam 42 provides a circumferentially closed and sealed configuration.

In order to assemble the inner aspirator section 34 within the flexible conduit section 30, the aspirator 34 is circumferentially compressed to reduce the gap 52 and thereby reduce the diameter of the aspirator tube 34. The reduction of the gap 52 is limited by the engagement between the respective shoulders 46, 46' and tongues 48, 48' on each edge of the seam and will impart an outward bias to the aspirator tube 34 so that when it is released the tube will attempt to return to its rest position thereby urging the aspirator tube 34 into firm compressive engagement against the flexible conduit 30. In the preferred embodiment illustrated, the flexible conduit section 30 is provided with a fixed cylindrical sleeve 58 on the end thereof opposite the end connected to the gas burner 16. The cylindrical sleeve 58 extends longitudinal for a short distance and provides a smooth cylindrical inner surface 60 that is engaged by the outer surface 62 of the outwardly biased aspirator 34 for maintaining the two sections in a desired adjusted position. The sleeve 58 is further provided with a stop detent 64 that cooperates with the aspirator tube 34 to prevent a telescopic disconnection of the tube assembly.

The aspirator tube 34 is provided with a longitudinal groove 66 on its outer surface for cooperation with the detent 64. The groove 66 extends from the end of the tube 34 containing the ports 38 up to but terminating at 68 just short of the end thereof positioned within the conduit section 30. The groove 66, as shown in FIG. 3, is positioned diametrically opposite the seam 42 although the exact positioning is not critical. The diametrically opposed positioning is preferred for aligning the groove 66 and detent 64 and facilitating more uniform compression of tube 34 during assembly. Upon full extension of the aspirator tube 34 the detent 64 will abutt against the end 68 of groove 66 to limit the telescopic extension of the assembly.

As mentioned, the lap connection provided by the rabbet joint seam of the present invention not only provides a metal to metal seal between the tongues 48, 48' and a spring diameter change but also provides significant cost savings in the manufacture of the assembly. By utilizing the seam construction of the present invention, the longitudinal recesses along each seam edge can be formed while the tube is still in a flat sheet form. The formation of the tube is then easily achieved utilizing a progressive die manufacturing process. This significantly reduces the labor cost by completely eliminating the prior welding operation while also obviating the necessity for an O-ring or set screw holding assembly. Of course, as can be appreciated, the present invention does not exclude the possibility of also using a set screw, if desired, as a backup holding device for the structure, although such an auxiliary holding mechanism is not needed in most instances.

As will be apparent to persons skilled in the art, various modifications, adaptations, and variations of the foregoing specific disclosure can be made without departing from the teachings of the present invention.

I claim:

1. In an adjustable gas/air feed assembly for a gas burner comprising a gas conduit section, an aspirator section mounted for telescopic sliding movement relative to said conduit section and means for holding said sections at a desired telescopic extension, the improvement wherein the means for holding said sections includes an adjustable seam carried by the inner section of the assembly, said seam being effective to circumferentially close said section while permitting limited radial contraction thereof whereby the inner section can be biased outwardly against the outer section of the assembly for holding said sections at a desired extended position.

2. The assembly of claim 1 wherein the adjusting seam extends longitudinally along a substantial portion of said inner section.

3. The assembly of claim 1 wherein the adjusting seam includes stop means limiting the radial contraction of said inner section.

4. The assembly of claim 1 wherein the adjustable seam is defined by complementary longitudinally extending edges of said inner section defining an adjustable gap.

5. The assembly of claim 4 wherein at least one of said edges includes a recess permitting said limited radial contraction of said inner section against the outward bias thereof.

6. The assembly of claim 1 wherein said seam is provided by a rabbet joint having an adjustable gap therein permitting closure thereof upon circumferential compression of said inner section.

7. The assembly of claim 1 wherein the aspirator section is provided with said adjustable seam.

8. The assembly of claim 1 wherein the conduit section is a flexible tubular member.

9. The assembly of claim 1 wherein the aspirator section is a longitudinally rigid tubular member.

10. The assembly of claim 1 wherein said inner and outer sections include aligning means cooperating during the full telescopic extension thereof.

11. The assembly of claim 10 wherein the aligning means includes a detent on one of said sections and a groove on the other of said sections for receiving the detent.

12. The assembly of claim 1 wherein said outer section is provided with a cylindrical sleeve on one end thereof for telescopically receiving said inner section, said inner section and said sleeve being provided with stop means cooperating to limit telescopic extension of the assembly.

13. The assembly of claim 12 wherein said stop means includes a detent on said sleeve.

14. The assembly of claim 1 wherein the adjustable seam includes a longitudinally extending shoulder defining an adjusting channel and a confronting edge spaced from said shoulder to define a gap therebetween, said channel being circumferentially longer than said gap, said inner section being sufficiently flexible to permit adjustable closure of said gap.

15. The assembly of claim 1 wherein the conduit section is a flexible member and the aspirator section is telescopically and slidably received therein, said seam extending longitudinally along said aspirator section and including complementary channels cooperating to permit limited resilient compressive adjustment thereof.

* * * * *